(12) United States Patent
Lee

(10) Patent No.: US 6,874,540 B2
(45) Date of Patent: Apr. 5, 2005

(54) PULSATION DAMPENER APPARATUS AND METHOD

(75) Inventor: Arley Gene Lee, Katy, TX (US)

(73) Assignee: Smith International, Inc.

( * ) Notice: Subject to any disclaimer, the term of this patent is extended or adjusted under 35 U.S.C. 154(b) by 73 days.

(21) Appl. No.: 10/179,123

(22) Filed: Jun. 25, 2002

(65) Prior Publication Data

US 2003/0034079 A1 Feb. 20, 2003

Related U.S. Application Data

(60) Provisional application No. 60/300,762, filed on Jun. 25, 2001.

(51) Int. Cl.[7] .................................................. F16L 55/04
(52) U.S. Cl. ........................................ 138/31; 175/135
(58) Field of Search ...................... 138/30, 31; 175/135, 175/8, 189, 293

(56) References Cited

U.S. PATENT DOCUMENTS

| | | | | |
|---|---|---|---|---|
| 2,953,352 A | * | 9/1960 | Webb | 267/125 |
| 3,353,613 A | * | 11/1967 | Harrison | 175/293 |
| 3,570,612 A | * | 3/1971 | Slator | 175/297 |
| 3,606,297 A | * | 9/1971 | Webb | 267/125 |
| 4,054,040 A | * | 10/1977 | Medders | 464/18 |
| 4,545,444 A | * | 10/1985 | Webb et al. | 175/296 |
| 4,683,944 A | * | 8/1987 | Curlett | 166/65.1 |
| 4,846,273 A | * | 7/1989 | Anderson et al. | 166/178 |
| 6,418,970 B1 | * | 7/2002 | Deul | 138/31 |
| 6,626,248 B1 | * | 9/2003 | Roberts | 175/5 |

\* cited by examiner

*Primary Examiner*—James Hook

(57) ABSTRACT

A pulsation dampener apparatus and method for dampening pulses within a fluid flow line during well drilling operations. The pulsation dampener apparatus comprises a cylindrical body having an annular chamber, a piston slidably disposed within the annular chamber, a gas column within the annular chamber and a means of communicating pulses from the fluid flow line to the piston. The piston is operated against the gas column to dampen the pulses within the fluid flow line.

20 Claims, 2 Drawing Sheets

PULSATION DAMPENER APPARATUS AND METHOD

CROSS-REFERENCE TO RELATED APPLICATIONS

This Application claims the benefit of U.S. Provisional Patent Application No. 60/300,762, filed on Jun. 25, 2001.

BACKGROUND OF INVENTION

1. Field of the Invention

The present invention generally relates to a method and apparatus for dampening pressure ripples or pulses that are produced when drilling a hydrocarbon well and more particularly, to dampening pulses during drilling operations that take place on a drilling ship.

2. Background Art

As a hydrocarbon well is drilled, pressure ripples or pulses are often produced by the drill bit and transmitted up the fluid flow line or mud column to the drilling rig. This pulsation can be very destructive, and if unchecked, can severely damage a drilling rig and associated equipment. Over a period of time, these pulsations will substantially increase maintenance cost, and thereby increase overall drilling costs. The likelihood of damage is substantially increased if the pulsations are a harmonic of the rig structures' resonate frequency. This is especially problematic with respect to drilling performed with a hammer drill bit while drilling offshore or on a drill ship.

In the prior art, a known technique to dampen pulses is to provide a volume or side branch that has zero impedance; that is, is resonant at the proper frequency. If this situation can be arranged, then all of the pulses will pass into the branch and none will pass into the fluid flow line thus, preventing potential damage to the rig or drilling vessel.

Typically, a technique to dampen pulsation is to provide a chamber or side branch near the pump output opening at the rig. In the case of offshore drilling or drilling from a drilling vessel, however, the sources of the pulses down hole can originate from the drill bit. This is particularly true when the drill bit is a hammer drill bit. Known pulsation dampening devices do not have the ability to dampen the destructive pulsations originating from a drill bit. Therefore, a need exists to provide a pulsation dampening apparatus near the drill bit. The present invention overcomes these and other limitations of known pulsation dampening devices.

SUMMARY OF INVENTION

The present invention prevents unwanted pulses during well drilling operations by providing an apparatus that comprises an annular chamber containing an annular piston that resonates at a predetermined frequency. This is accomplished by the piston working against an annular gas column in a typical air spring fashion. The annular gas chamber is filled at the surface with a volume and pressure of gas that is sufficient to counter any hydrostatic pressure at the apparatus' operational depth. Methods of calculating sufficient volumes and pressure, taking into account temperature and drilling depth, are well known by those skilled in the art. In the preferred embodiment, the annular gas column is composed of nitrogen. The apparatus is positioned in the drill string substantially proximate the drill bit.

While in the preferred embodiment, the pulsation dampening apparatus is designed and configured to dampen a thirty hertz a pulse, it will be appreciated by those skilled in the art that the design and configuration of the apparatus can be adapted to dampen a pulse of any frequency. This is may be accomplished by varying the dimensions and mass of the piston, and also by varying the dimensions of the annular gas chamber. Methods of calculating the dimensions for a pulsation dampening device of another frequency are well know by those skilled in the art.

In another aspect, the present invention relates to a method for of dampening pulses in a mud column or fluid flow line during well drilling operations. This method comprises positioning a pulsation dampener apparatus in a drill string substantially proximate a drill bit, filling the annular chamber with a precalculated amount of gas, drilling a wellbore wherein unwanted pulses are dampened by the pulsation dampener apparatus during drilling operations. In other embodiments of the present invention, the drilling occurs offshore from a drill ship, semi submersible platform, or other offshore drilling device.

Other aspects and advantages of the invention will be apparent from the following description and the appended claims.

BRIEF DESCRIPTION OF DRAWINGS

For a more detailed description of the preferred embodiment of the present invention, the references will now be made to the accompanied drawings.

DETAILED DESCRIPTION

Figure 1:
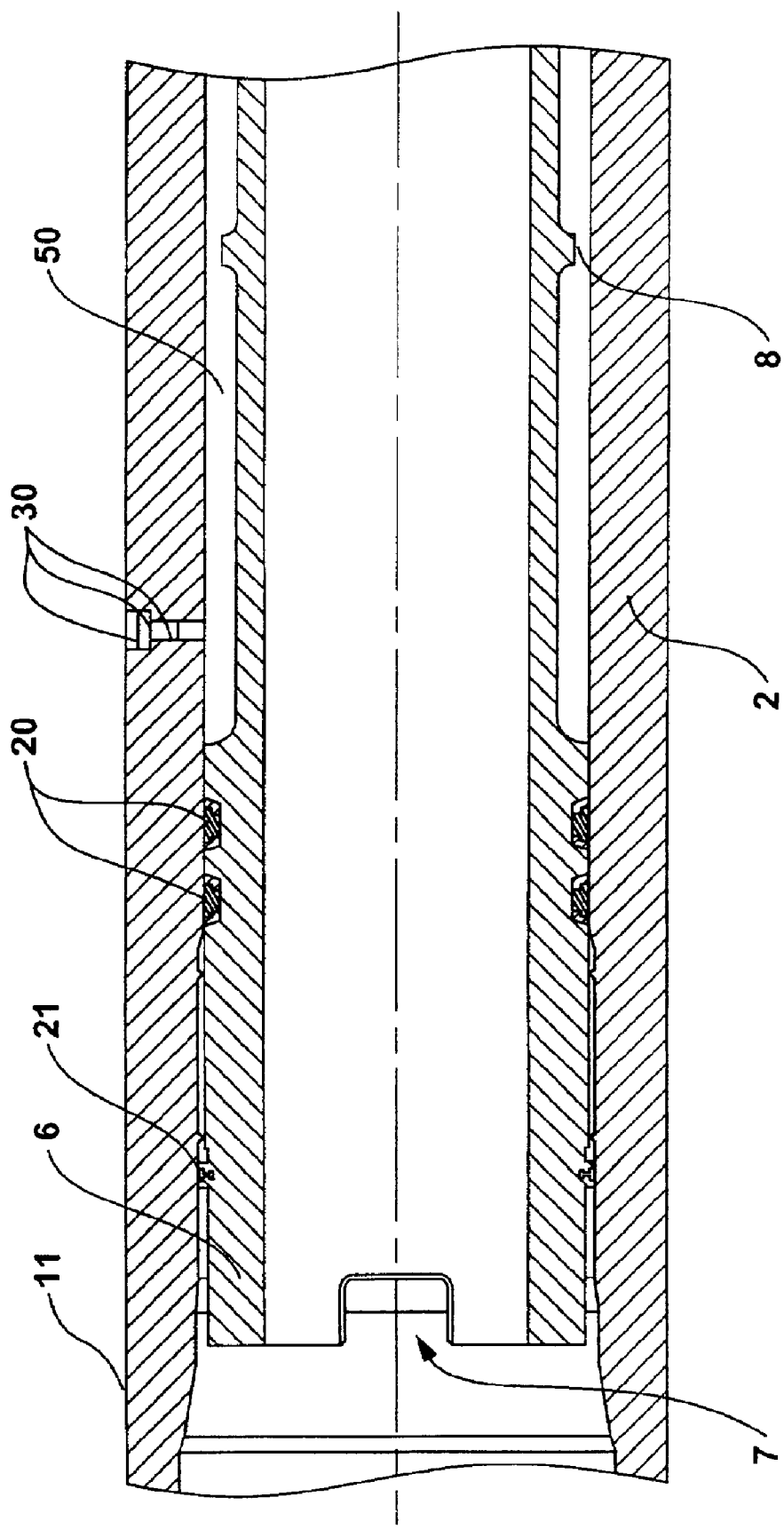
FIG. 1 is a side cross-sectional view of the top portion of the pulsation dampener apparatus.

Embodiments of the invention will now be described with reference to the accompanying figures, wherein like reference characters are used for like features throughout the several views.

Figure 2:
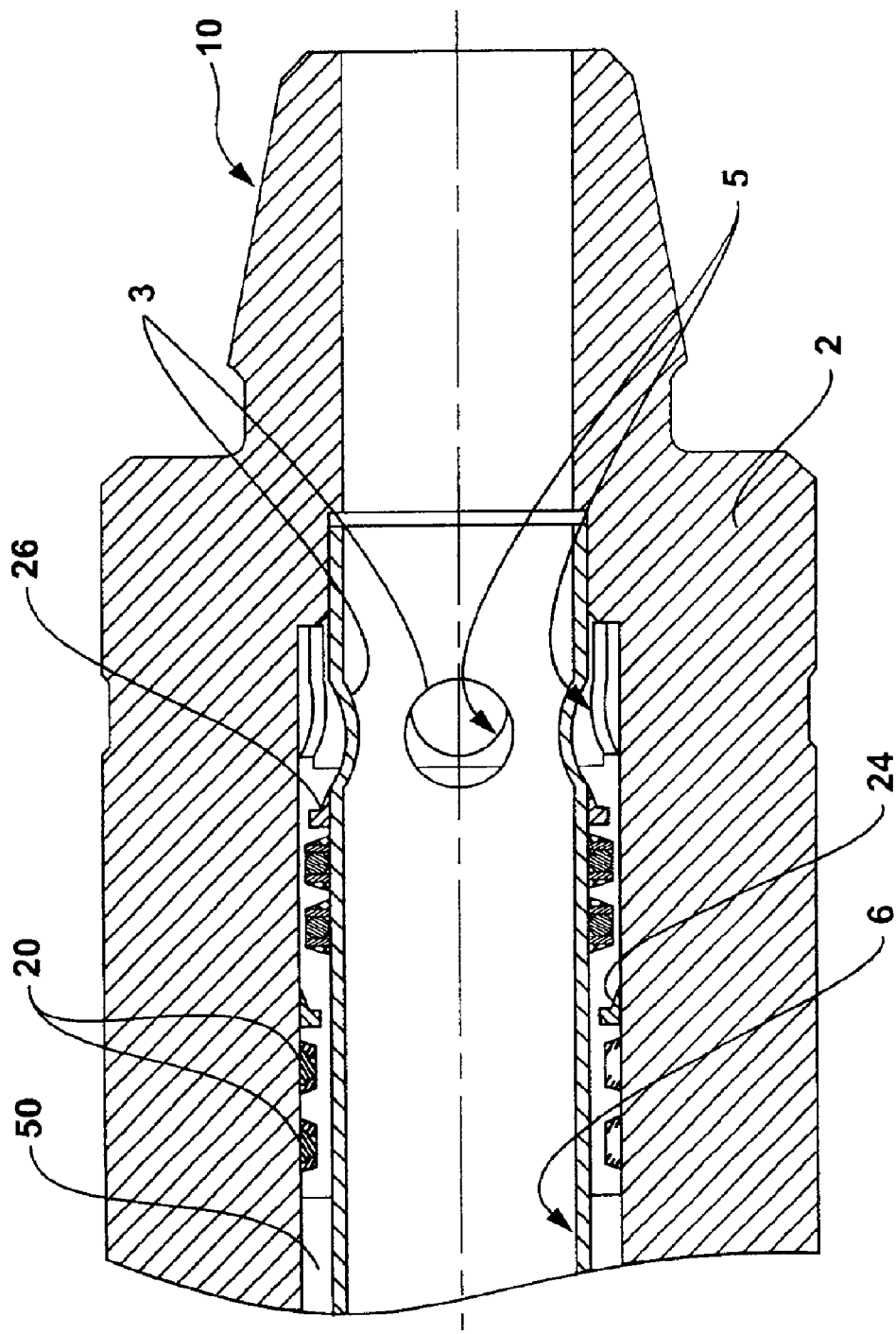
FIG. 2 is a side cross-sectional view of the bottom portion of the pulsation dampener apparatus.

Referring to FIGS. 1 and 2, there is shown the preferred embodiment of the downhole pulsation dampener apparatus of the present invention. As it will be more fully described, the apparatus 1 may have a variety of purposes including to dampen vibrations on a drill ship such as those caused by the use of a hammer bit. It is intended that the apparatus be assembled in the drill string near the drill bit and in a preferred embodiment, substantially proximate to a hammer drill bit.

As shown in FIG. 1, the apparatus 1 includes a body 2, a cylinder 6 disposed within the body 2 and a piston 4, slidably disposed on the cylinder 6. To facilitate its attachment to the drill string, the body 2 is provided with conventional internal or box threads 11 at one end for connection to the work string, a drill bit (not shown), or other tools. At the opposite end, the body 2 is provided with conventional pin threads 10 for connection to the work string or other tools. Other connection methods known in the art may also be used to connect the tool to a work string. It will be appreciated by those skilled in the art that the pulsation dampener may be run using a conventional drill string, coil tubing, or other know running methods.

An annular chamber 50 is formed between the body 2 and the cylinder 6 and is adapted to be filled with a gaseous material. O-rings 21 and T-seals 23 prevent leakage from the annular chamber 50 between housing 2 and cylinder 6. Referring to FIG. 2, the chamber 50 is bounded at an end by damper piston 4. In the preferred embodiment, there is at least one seal 20 between the exterior surface of the cylinder 6 and the interior surface of the piston 4. At least one seal 20 is also positioned between the exterior surface of the damper piston 4 and the interior surface of the body 2 to seal the chamber 50 at the opposite end. On the outer surface of piston 4 is a cylinder wiper 24, and on the inner surface of piston 4 is a cylinder wiper 26.

Shown in FIG. 1, a stop ring 8 on the cylinder 6 prevents axial movement by the piston 4 within the chamber 50 past the ring 8. Wrench slots 7 on cylinder 6 serve to provide a means to assemble and disassemble the apparatus 1.

At an end of the damper piston 4 are at least one piston aperture 5. At an end of cylinder 6 are at least one cylinder aperture 3. Cylinder aperture 3 and piston aperture 5 act as means by which mud pulses or ripples that travel up the mud column communicate with the piston 4.

In an alternative embodiment, a shock absorption ring or piston bumper 70 is located about inner shoulder 65 of the body 2. Piston bumper 70 acts to reduce stress on the piston 4 during operations, should piston 4 and contact shoulder 65.

The present invention dampens the fluid flow line pulses by providing the piston 4 that resonates at thirty hertz. However, it will be appreciated by those skilled in the art that the design and configuration of the apparatus can be adapted to dampen a pulse of any frequency. This is may be accomplished by varying the dimensions and mass of the piston, and also by varying the dimensions of the annular gas chamber. Methods of calculating the dimensions for a pulsation dampening device of another frequency are well know by those skilled in the art.

A gas fill unit 30 within the body 2 acts as a means for filling the chamber 50 with gas to create an annular gas column. In the preferred embodiment, the gas is nitrogen. The gas fill unit 30 is composed of snap rings 31, port plug 32, and cartridge valve 33 (not shown). The annular chamber is filled at the surface with a volume of gas to a sufficient pressure to counter any hydrostatic pressure at the apparatus' operational depth. Methods of calculating sufficient gas volume and pressure, taking into account temperature and drilling depth, are well known by those skilled in the art.

The piston 4 works against an annular gas column in a typical air spring fashion. In operation, pulsations traveling within a fluid flow line during well drilling operations are absorbed as they are transmitted through the body and cylinder and into the cylinder aperture 3, thereby compressing the piston. The piston thus operates against the gas column to dampen the pulses within the fluid flow line.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A pulsation dampener apparatus for dampening pulses within a fluid flow line during well drilling operations, said apparatus comprising:
    a cylindrical body having an annular chamber;
    a piston slidably disposed within said annular chamber;
    a means of communicating pulses from the fluid flow line to said piston; and
    a gas column within said annular chamber, wherein said piston is operated against said gas column to dampen the pulses.

2. The pulsation dampener apparatus of claim 1 wherein said piston and said chamber are concentrically positioned around the fluid flow line.

3. The pulsation dampener apparatus of claim 1 wherein said means of communicating pulses from the fluid flow line to said piston is at least one aperture.

4. The pulsation dampener apparatus of claim 1 wherein said means of communicating pulses from the fluid flow line to said piston is a plurality of radially spaced apertures.

5. The pulsation dampener apparatus of claim 1, further comprising a means of filling said annular chamber with said gas column.

6. The pulsation dampener apparatus claim 1, further comprising a piston bumper disposed within said annular chamber.

7. The pulsation dampener apparatus of claim 1 wherein said gas column is nitrogen.

8. The pulsation dampener apparatus of claim 1, further comprising a stop ring for partially restricting axial movement of said piston within said annular chamber.

9. A pulsation dampener apparatus for dampening pulses within a fluid flow line during well drilling operations, said apparatus comprising:
    a tubular body;
    a cylinder concentrically disposed within said tubular body;
    a piston slidably disposed between said tubular body and said cylinder;
    a gas chamber between said tubular body and said cylinder, and adjacent said piston,
    wherein said gas chamber is adapted to be filled with a compressible material; and
    wherein said cylinder has at least one aperature for fluid communication between said piston and the fluid flow line.

10. The pulsation dampener apparatus of claim 9 wherein said piston and said gas chamber are concentrically positioned around the fluid flow line.

11. The pulsation dampener apparatus of claim 9 further comprising a means of filling said chamber with a gas.

12. The pulsation dampener apparatus of claim 11 wherein the gas is nitrogen.

13. The pulsation dampener apparatus of claim 9 further comprising a piston bumper disposed between said tubular body and said cylinder.

14. The pulsation dampener apparatus of claim 9 wherein said cylinder further comprises a stop ring for partially restricting axial movement of said piston.

15. A method of dampening pulses in a fluid flow line during well drilling operations, said method comprising:
    a) positioning a pulsation dampener apparatus in a drill string substantially proximate a drill bit, wherein said apparatus comprises a cylindrical body having an annular chamber; a piston slidably disposed within said annular chamber; a means of communicating pulses from the fluid flow line to said piston;
    b) filling the annular chamber with a pre-calculated amount of gas; and
    c) drilling a wellbore wherein unwanted pulses are dampened by the pulsation dampener apparatus during the drilling operations.

16. The method of claim 15 wherein the pulsation dampener apparatus is positioned substantially proximate a hammer drill bit.

17. The method of claim 15 wherein the drilling occurs offshore.

18. The method of claim 17 wherein the drilling occurs from a drill ship.

19. The method of claim 17 wherein the drilling occurs from a semi-submersible platform.

20. The method of claim 17 wherein the pre-calculated amount of gas is sufficient to counter hydrostatic pressure at operational depth.

* * * * *